United States Patent
Takahashi et al.

(10) Patent No.: US 10,634,314 B2
(45) Date of Patent: Apr. 28, 2020

(54) LIGHT SOURCE DEVICE, PROJECTOR APPARATUS EQUIPPED WITH LIGHT SOURCE DEVICE, AND ILLUMINATING APPARATUS EQUIPPED WITH LIGHT SOURCE DEVICE

(71) Applicant: SHARP KABUSHIKI KAISHA, Sakai, Osaka (JP)

(72) Inventors: Koji Takahashi, Sakai (JP); Karl Peter Welna, Oxford (GB)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/294,202

(22) Filed: Mar. 6, 2019

(65) Prior Publication Data
US 2019/0301708 A1 Oct. 3, 2019

(30) Foreign Application Priority Data
Mar. 27, 2018 (JP) .................. 2018-059789

(51) Int. Cl.
| | |
|---|---|
| G03B 21/14 | (2006.01) |
| H04N 9/31 | (2006.01) |
| F21V 9/14 | (2006.01) |
| F21V 9/32 | (2018.01) |
| G03B 21/20 | (2006.01) |
| F21Y 115/30 | (2016.01) |

(52) U.S. Cl.
CPC .................. *F21V 9/14* (2013.01); *F21V 9/32* (2018.02); *G03B 21/204* (2013.01); *G03B 21/2033* (2013.01); *G03B 21/2053* (2013.01); *G03B 21/2073* (2013.01); *H04N 9/3167* (2013.01); *F21Y 2115/30* (2016.08)

(58) Field of Classification Search
CPC ...... G03B 21/14; G03B 21/204; G03B 21/16; G03B 21/006; G03B 21/2073; H04N 9/3161; H04N 9/3158; F21V 9/14; F21V 9/32; F21Y 2115/30
See application file for complete search history.

(56) References Cited

U.S. PATENT DOCUMENTS

| | | | |
|---|---|---|---|
| 8,523,367 B2 | 9/2013 | Ogura | |
| 9,250,505 B2 | 2/2016 | Ogura | |
| 10,051,248 B2* | 8/2018 | Jeoung | ............... G03B 21/204 |
| 2005/0190345 A1* | 9/2005 | Dubin | ............... G03B 21/2053 |
| | | | 353/85 |
| 2013/0100423 A1 | 4/2013 | Yamagishi et al. | |

FOREIGN PATENT DOCUMENTS

| | | |
|---|---|---|
| JP | 2010-237443 A | 10/2010 |
| JP | 2013-101317 A | 5/2013 |

* cited by examiner

*Primary Examiner* — William C. Dowling
(74) *Attorney, Agent, or Firm* — ScienBiziP, P.C.

(57) ABSTRACT

A light source device includes a semiconductor laser that outputs laser light, a polarization rotator that rotates a polarization plane of the light, a polarization splitter that transmits and reflects the light in accordance with the polarization plane, and a fluorescent body that emits light by being excited by the laser light. The light source device controls an amount of the light that excites the fluorescent body by controlling a rotational angle of the polarization plane in the polarization rotator in a time-series fashion.

13 Claims, 13 Drawing Sheets

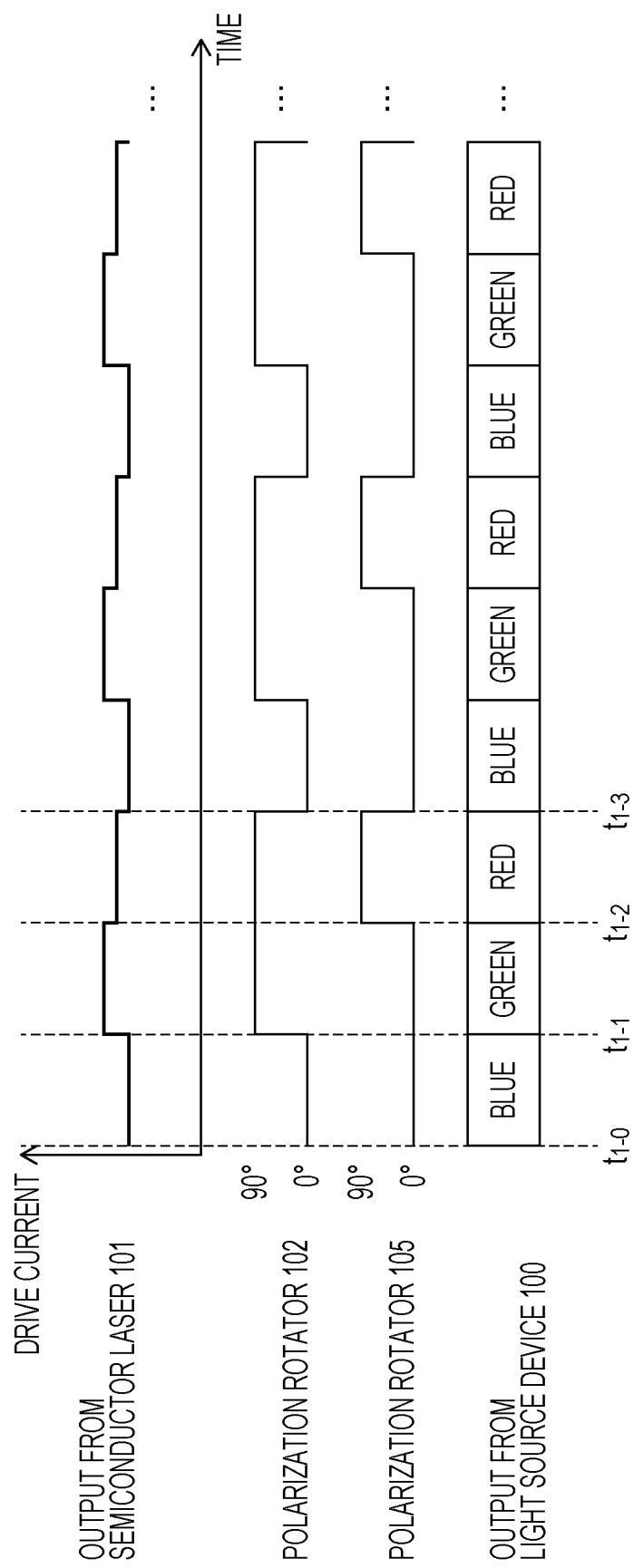

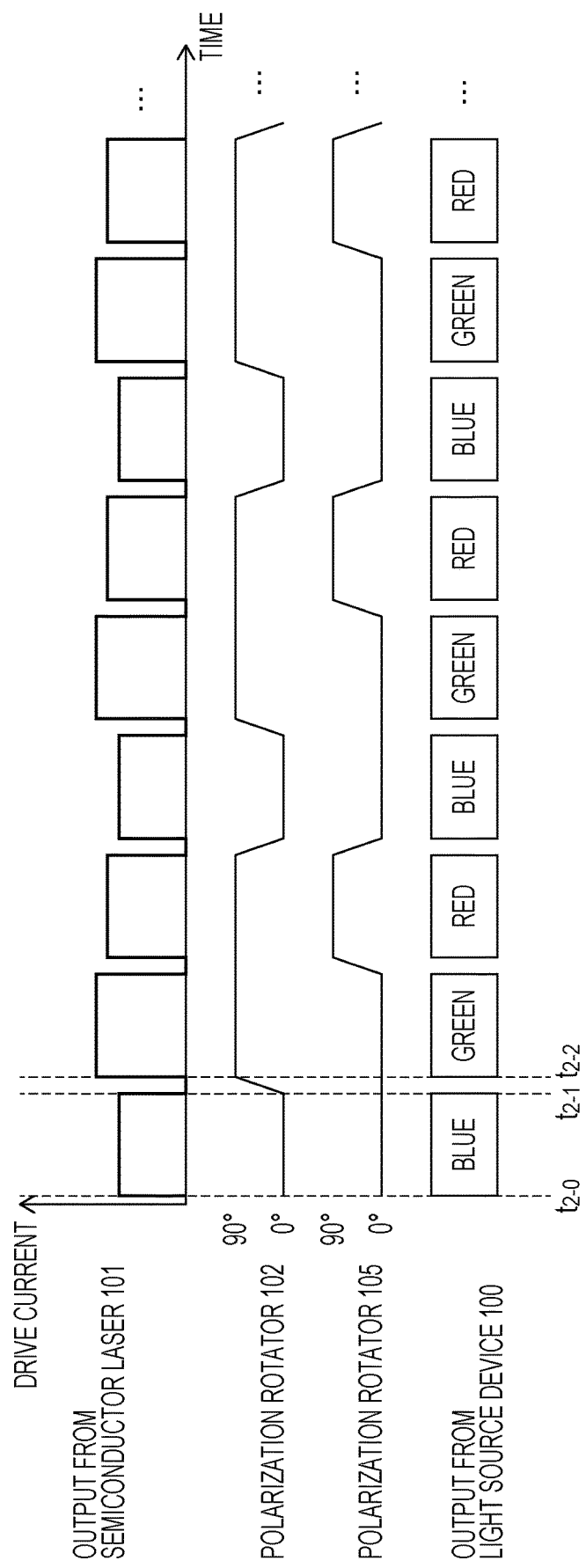

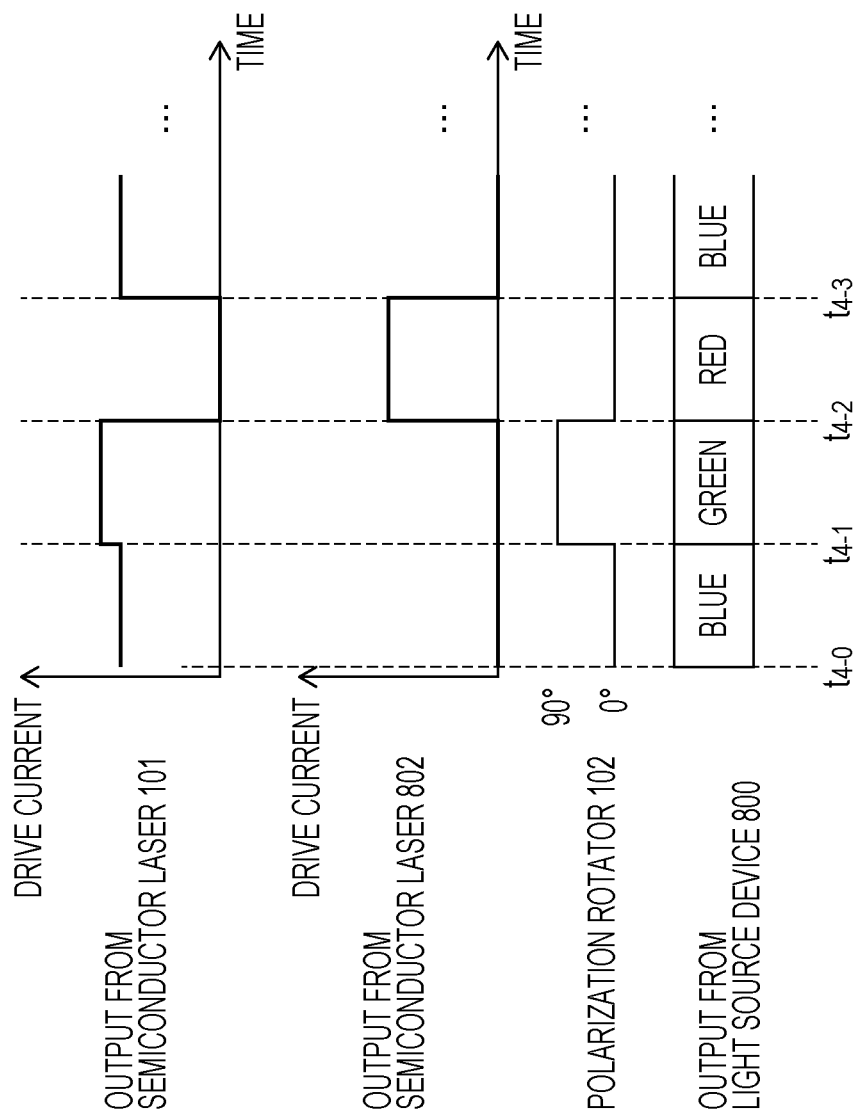

LIGHT SOURCE DEVICE, PROJECTOR APPARATUS EQUIPPED WITH LIGHT SOURCE DEVICE, AND ILLUMINATING APPARATUS EQUIPPED WITH LIGHT SOURCE DEVICE

BACKGROUND

1. Field

The present disclosure relates to light source devices.

2. Description of the Related Art

A light source that outputs light beams of a plurality of colors in a time-series fashion by using a laser element and a fluorescent body is employed in a projector apparatus or illuminating apparatus that uses a digital mirror device (DMD) as an image display element.

In a case where laser light is focused onto a fluorescent body, the fluorescent body generates heat due to the high energy density of the laser light. This is problematic in that the luminous efficiency of the fluorescent body deteriorates.

As a countermeasure against this problem, for example, Japanese Unexamined Patent Application Publication No. 2010-237443 proposes a configuration in which a layer of the fluorescent body is formed on the surface of a substantially circular-disk-shaped wheel, and the laser light is radiated while the wheel is rotated by using a motor, so that the heat generated from the fluorescent body is dissipated.

Japanese Unexamined Patent Application Publication No. 2013-101317 discloses a light source that splits laser light into transmitted light and reflected light in a time-division fashion by using a wheel having a laser-light reflecting region and a laser-light transmitting region, and that outputs light beams of a plurality of colors in a time-series fashion by causing the transmitted light and the reflected light to excite different fluorescent bodies.

However, with regard to a light source that uses laser light and a fluorescent body, the configuration that uses a wheel to dissipate heat generated by the fluorescent body and to obtain light beams of a plurality of colors has the following problems. Firstly, the size of the wheel has to be increased for dissipating the heat generated by the fluorescent body. Secondly, a mechanical component, such as a motor, has to be provided for rotating the wheel, thus leading to an increase in the number of components as well as an increase in cost.

It is desirable to provide a light source device that uses laser light and a fluorescent body and that can output light beams of a plurality of colors in a time-series fashion while reducing heat generated by the fluorescent body without using a large-size component, such as a wheel, or a mechanical component, such as a motor.

SUMMARY

According to an aspect of the disclosure, there is provided a light source device including a semiconductor laser that outputs laser light, a polarization rotator that rotates a polarization plane of the light output from the semiconductor laser in accordance with a control signal, a polarization splitter that transmits and reflects the light passing through the polarization rotator in accordance with the polarization plane, and a fluorescent body that emits light by being excited by the light traveling via the polarization splitter. An amount of the light that excites the fluorescent body is controlled in a time-series fashion by controlling a rotational angle of the polarization plane in the polarization rotator in a time-series fashion.

BRIEF DESCRIPTION OF THE DRAWINGS

FIG. 4 is a diagram related to time-series control of the semiconductor laser and polarization rotators in accordance with the first embodiment;

FIG. 5 is a diagram related to time-series control of the semiconductor laser and the polarization rotators in accordance with the first embodiment;

FIG. 10 is a diagram related to time-series control of semiconductor lasers and a polarization rotator in accordance with the third embodiment;

DESCRIPTION OF THE EMBODIMENTS

First Embodiment

Figure 1:
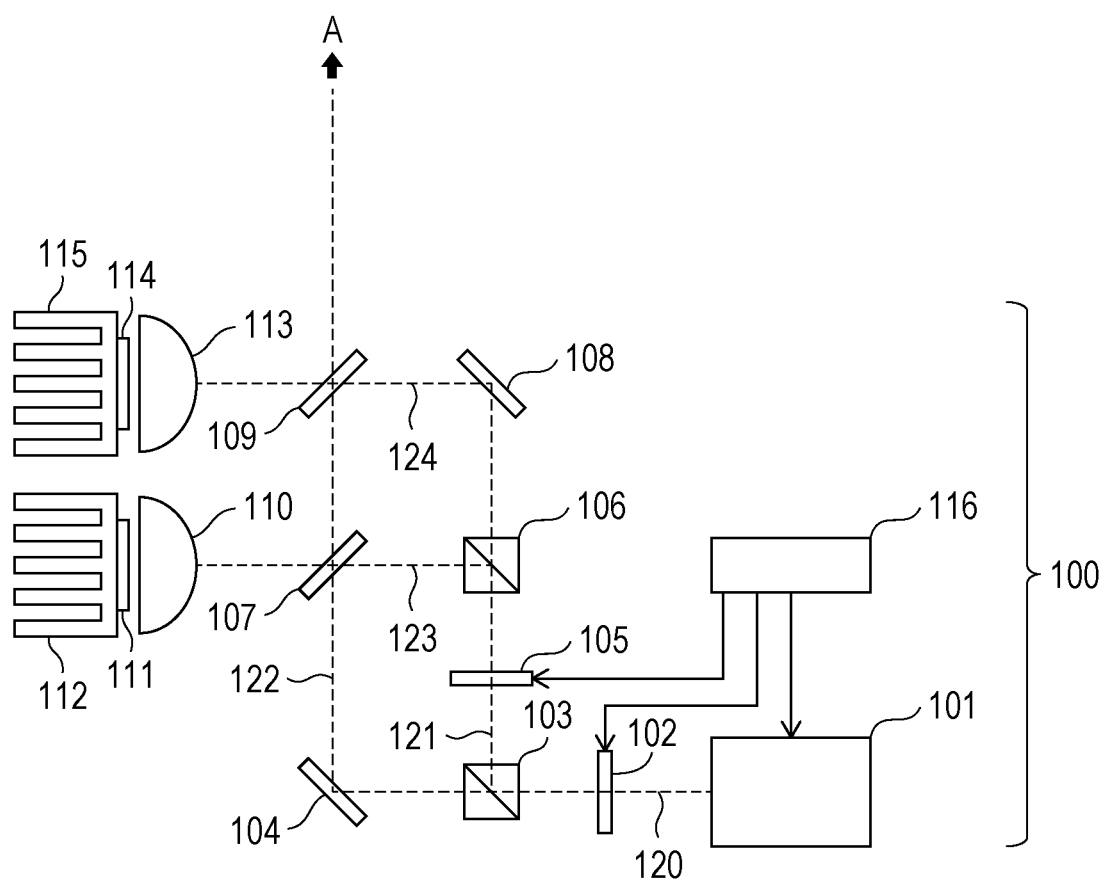
FIG. 1 illustrates the configuration of a light source device according to a first embodiment.

FIG. 1 illustrates the configuration of a light source device 100 according to a first embodiment.

The light source device 100 includes a semiconductor laser 101, polarization rotators 102 and 105, polarization splitters 103 and 106, reflection mirrors 104 and 108, dichroic mirrors 107 and 109, focusing lenses 110 and 113, fluorescent bodies 111 and 114, heatsinks 112 and 115, and a control circuit 116.

The semiconductor laser 101 outputs blue linearly-polarized laser light, which is perpendicular to an optical axis 120 and parallel to the plane of the drawing, along the optical axis 120.

Each of the polarization rotators 102 and 105 is constituted of, for example, a liquid crystal element that rotates a polarization plane of light incident in accordance with a supplied drive voltage by an arbitrary rotational angle within a 360° range.

Each of the polarization splitters 103 and 106 is constituted of, for example, a prism that splits incident light into two polarized light components that are orthogonal to each other in accordance with the polarization plane. More specifically, each of the polarization splitters 103 and 106 splits the incident light in two directions by transmitting one of the two polarized light components that are orthogonal to each other and reflecting the other polarized light component. The laser light output from the semiconductor laser 101 according to this embodiment is transmitted through the polarization splitter 103 if the polarization plane is not rotated by the polarization rotator 102, and is reflected by the polarization splitter 103 if the polarization plane is rotated by 90° by the polarization rotator 102. Furthermore, in a case where the polarization plane is also rotated by 90° by the polarization rotator 105 in a state where the polarization plane is rotated by 90° by the polarization rotator 102, the laser light output from the semiconductor laser 101 according to this embodiment is transmitted through the polarization splitter 106. In a case where the polarization plane is not rotated by 90° by the polarization rotator 105 in a state where the polarization plane is rotated by 90° by the polarization rotator 102, the laser light is reflected by the polarization splitter 106. The expression "the polarization plane is rotated by 90°" refers to a case where the polarization plane is rotated by 90° or 270°. The expression "the polarization plane is not rotated by 90°" includes a case where the polarization plane is rotated by 180°, which is equivalent to a state where the polarization plane is substantially not rotated. Light entering the polarization splitter 103 after traveling along the optical axis 120 becomes transmitted light that travels along the optical axis 120 and reflected light that travels along an optical axis 121. Light entering the polarization splitter 106 after traveling along the optical axis 121 becomes transmitted light that travels along the optical axis 121 and reflected light that travels along an optical axis 123.

The reflection mirrors 104 and 108 each reflect incident light. The light incident on the reflection mirror 104 after traveling along the optical axis 120 travels along an optical axis 122. The light incident on the reflection mirror 108 after traveling along the optical axis 121 travels along an optical axis 124.

Each of the dichroic mirrors 107 and 109 reflects light of a specific wavelength and transmits light of other wavelengths. The dichroic mirror 107 at least reflects light in the green waveband and at least transmits light in the blue (laser light) waveband. The dichroic mirror 109 at least reflects light in the red waveband and at least transmits light in the blue (laser light) waveband and light in the green waveband. The semiconductor laser 101 according to this embodiment outputs blue light. Therefore, light output from the semiconductor laser 101, transmitted through the polarization splitter 103, and reflected by the reflection mirror 104 is transmitted through the dichroic mirrors 107 and 109 and is output in the direction of an arrow A. Light output from the semiconductor laser 101, reflected by the polarization splitter 103, and reflected by the polarization splitter 106 is transmitted through the dichroic mirror 107 and then enters the fluorescent body 111 via the focusing lens 110. Likewise, light output from the semiconductor laser 101, reflected by the polarization splitter 103, transmitted through the polarization splitter 106, and reflected by the reflection mirror 108 is transmitted through the dichroic mirror 109 and then enters the fluorescent body 114 via the focusing lens 113.

Each of the fluorescent bodies 111 and 114 emits light by being excited by blue laser light. The fluorescent body 111 emits green light, and the fluorescent body 114 emits red light. An example of a fluorescent body that emits green light is a β-SiAlON fluorescent body or a LuAG fluorescent body. An example of a fluorescent body that emits red light is a CASN fluorescent body or an sCASN fluorescent body. The green light emitted from the fluorescent body 111 enters the optical axis 123 by being focused by the focusing lens 110, travels along the optical axis 122 by being reflected by the dichroic mirror 107, is transmitted through the dichroic mirror 109, and is output in the A direction. The red light emitted from the fluorescent body 114 enters the optical axis 124 by being focused by the focusing lens 113, travels along the optical axis 122 by being reflected by the dichroic mirror 109, and is output in the A direction. The rear surfaces of the fluorescent bodies 111 and 114 are provided with the heatsinks 112 and 115 for dissipating heat. The method for dissipating heat from the fluorescent bodies 111 and 114 is not limited to this, and any known method may be used.

The control circuit 116 has a function for controlling the drive current to be supplied to the semiconductor laser 101 and for outputting control signals to be supplied to the polarization rotators 102 and 105 (e.g., for controlling applied voltages). The drive current to be supplied to the semiconductor laser 101 and the control signals to be supplied to the polarization rotators 102 and 105 are controlled while being synchronized by the control circuit 116.

An output from the light source device 100 is input to an image controller (not illustrated), such as a digital mirror device (DMD), disposed in front of the light source device 100 in the A direction.

Figure 2A:
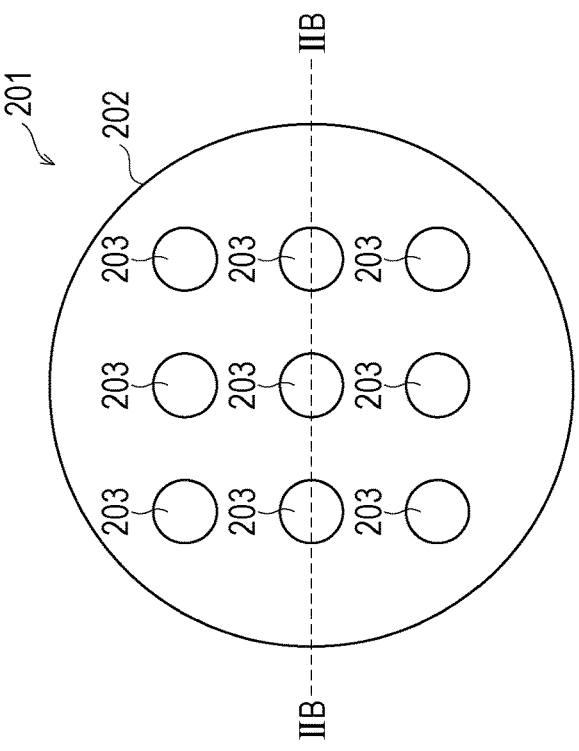
FIGS. 2A to 2C illustrate the configuration of a semiconductor laser according to the first embodiment, FIG. 2A being a front view of a semiconductor laser unit constituting the semiconductor laser, FIG. 2B being a cross-sectional view of the semiconductor laser unit, and FIG. 2C being a cross-sectional view of the semiconductor laser unit and two lenses constituting the semiconductor laser.
Figure 2B:
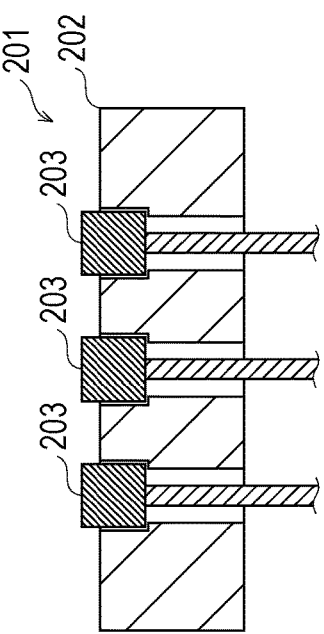
Figure 2C:
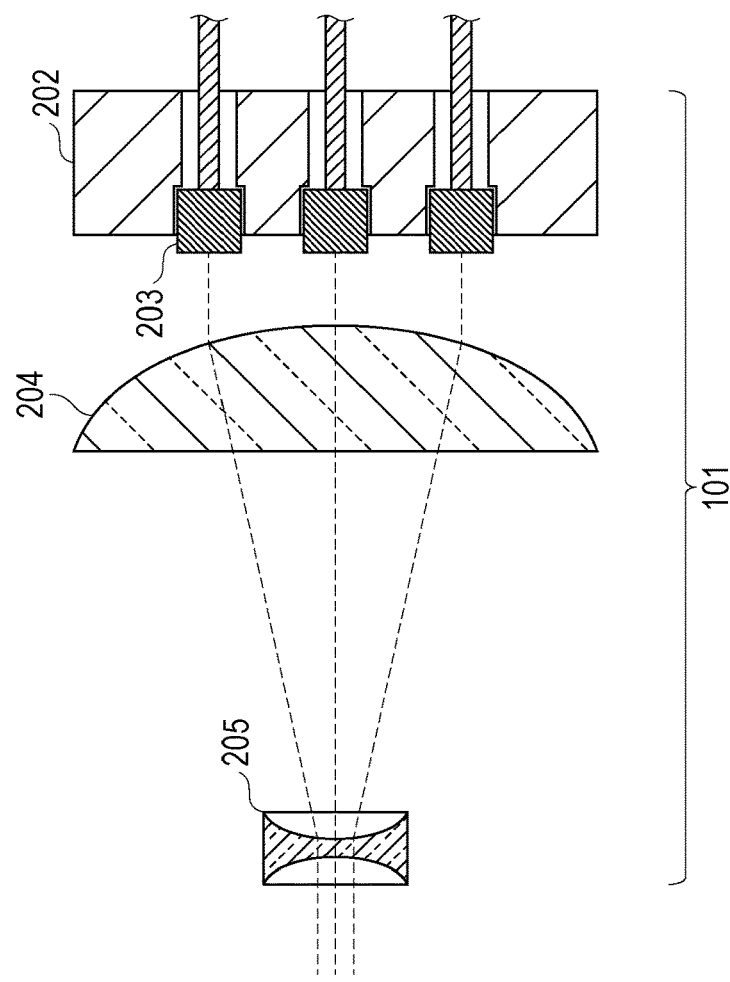

FIGS. 2A to 2C illustrate the configuration of the semiconductor laser 101 included in the light source device 100 illustrated in FIG. 1. The semiconductor laser 101 according to this embodiment includes a semiconductor laser unit 201 having a plurality of collimator-lens-equipped semiconductor laser elements, and also includes a convex lens 204 and a concave lens 205 disposed in front thereof.

FIG. 2A is a front view of the semiconductor laser unit 201, and FIG. 2B is a cross-sectional view of the semiconductor laser unit 201, taken along line IIB-IIB in FIG. 2A. As illustrated in FIGS. 2A and 2B, the semiconductor laser unit 201 has a structure in which nine collimator-lens-equipped semiconductor laser elements 203 are embedded in recesses provided in a heatsink 202. In order for the convex lens 204 and the concave lens 205, which are substantially circular, to be readily disposed in front of the semiconductor laser unit 201, the heatsink 202 has a substantially circular shape, as viewed from the front thereof. The collimator-lens-equipped semiconductor laser elements 203 embedded in the heatsink 202 are configured to output blue laser light (with a wavelength of 450 nm) with power up to a maximum of 10 W. The nine collimator-lens-equipped semiconductor laser elements 203 are arranged at equal intervals so as to evenly dissipate heat. The collimator-lens-equipped semiconductor laser elements 203 individually have electrode lead wires extending from the rear surface of the heatsink 202 so as to be connected to the control circuit 116 in FIG. 1. By receiving the drive voltage supplied from the control circuit 116, the collimator-lens-equipped semiconductor laser elements 203 can be driven individually. The nine collimator-lens-equipped semiconductor laser elements 203 according to this embodiment have polarization planes arranged in one direction.

FIG. 2C is a cross-sectional view of the convex lens 204 and the concave lens 205 that are disposed in front of the semiconductor laser unit 201. Blue collimated beams output from the nine collimator-lens-equipped semiconductor laser elements 203 are focused by these two lenses and are output from the semiconductor laser 101 as collimated beams.

Although nine collimator-lens-equipped semiconductor laser elements 203 are provided, the number thereof is not limited. Alternatively, one or more collimator-lens-equipped semiconductor laser elements 203 may be used. Moreover, the method for dissipating heat from the semiconductor laser unit 201 is not limited to the example illustrated in FIGS. 2A and 2B, and any known method may be used.

Figure 3A:
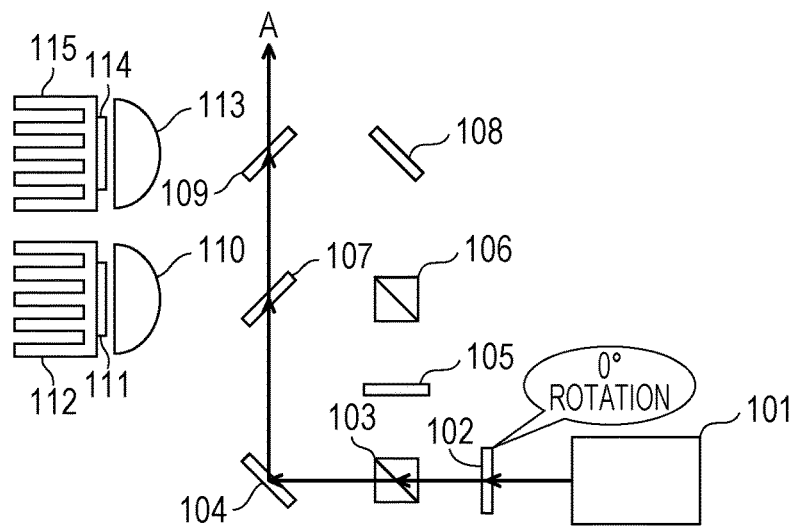
FIGS. 3A to 3C illustrate an example of the operation of the light source device according to the first embodiment, FIG. 3A illustrating the operation when the light source device outputs blue light, FIG. 3B illustrating the operation when the light source device outputs green light, and FIG. 3C illustrating the operation when the light source device outputs red light.
Figure 3B:
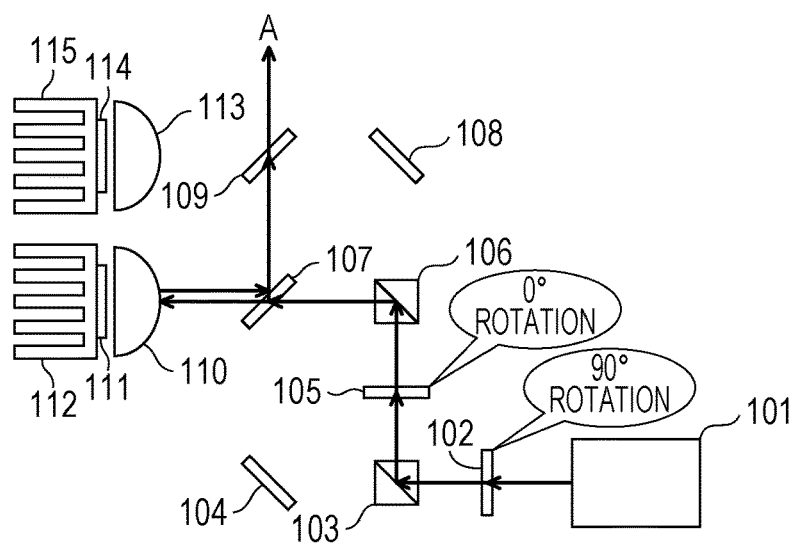
Figure 3C:
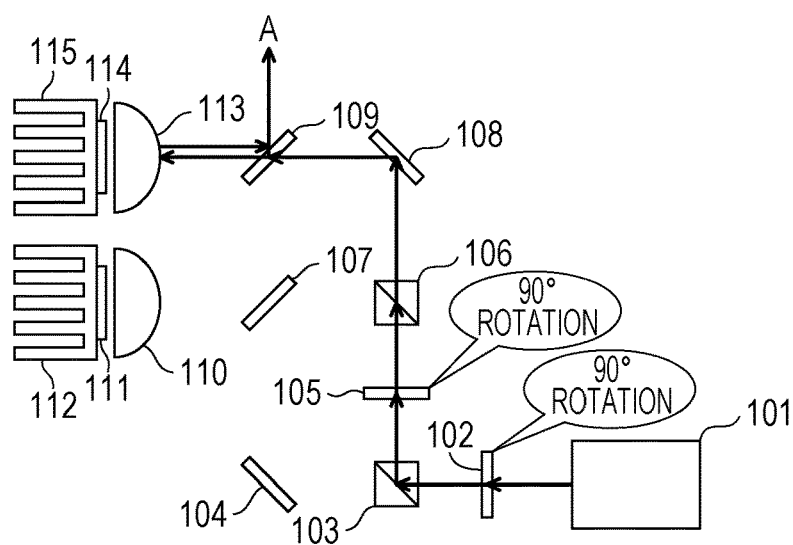

FIGS. 3A to 3C illustrate an example of the operation of the light source device 100 in FIG. 1.

FIG. 3A illustrates a state where the light source device 100 is outputting blue light. As illustrated in FIG. 3A, when the polarization rotator 102 is controlled such that the polarization plane of laser light is maintained, blue laser light output from the semiconductor laser 101 is transmitted through the polarization splitter 103, is reflected by the reflection mirror 104, is transmitted through the dichroic mirrors 107 and 109, and is output in the A direction. Consequently, the blue light is output from the light source device 100.

FIG. 3B illustrates a state where the light source device 100 is outputting green light. As illustrated in FIG. 3B, when the polarization rotator 102 is controlled such that the polarization plane of laser light is rotated by 90° and the polarization rotator 105 is controlled such that the polarization plane of laser light is maintained, blue laser light output from the semiconductor laser 101 is reflected by the polarization splitters 103 and 106, is transmitted through the dichroic mirror 107, and enters the fluorescent body 111. The fluorescent body 111 emits green light by being excited by the incident light. The green light emitted from the fluorescent body 111 is focused by the focusing lens 110, is reflected by the dichroic mirror 107, is transmitted through the dichroic mirror 109, and is output in the A direction. Consequently, the green light is output from the light source device 100.

FIG. 3C illustrates a state where the light source device 100 is outputting red light. As illustrated in FIG. 3C, when the polarization rotators 102 and 105 are controlled such that the polarization planes of laser light are rotated by 90°, blue laser light output from the semiconductor laser 101 is reflected by the polarization splitter 103, is transmitted through the polarization splitter 106, is reflected by the reflection mirror 108, is transmitted through the dichroic mirror 109, and enters the fluorescent body 114. The fluorescent body 114 emits red light by being excited by the incident light. The red light emitted from the fluorescent body 114 is focused by the focusing lens 113, is reflected by the dichroic mirror 109, and is output in the A direction. Consequently, the red light is output from the light source device 100.

FIG. 4 is a diagram related to time-series control of the semiconductor laser 101 and the polarization rotators 102 and 105.

By setting the rotational angle of the polarization plane in the polarization rotator 102 to 0° and the rotational angle of the polarization plane in the polarization rotator 105 to 0° in a period between a time point t1-0 and a time point t1-1, blue light is output from the light source device 100.

By setting the rotational angle of the polarization plane in the polarization rotator 102 to 90° and the rotational angle of the polarization plane in the polarization rotator 105 to 0° in a period between the time point t1-1 and a time point t1-2, green light is output from the light source device 100.

By setting the rotational angle of the polarization plane in the polarization rotator 102 to 90° and the rotational angle of the polarization plane in the polarization rotator 105 to 90° in a period between the time point t1-2 and a time point t1-3, red light is output from the light source device 100.

By repeating this at a fixed cycle (e.g., 120 Hz), light beams of three colors, namely, blue, green, and red, are periodically output from the light source device 100. In order to balance out the blue, green, and red light beams, the output from the semiconductor laser 101 is adjusted in synchronization with the timing at which the rotational angles of the polarization planes in the polarization rotators 102 and 105 are changed.

Although the polarization planes in the polarization rotators 102 and 105 are instantaneously rotated in the example in FIG. 4, the rotation of the polarization plane in each of the polarization rotators 102 and 105 may take some time in actuality. In that case, as illustrated in FIG. 5, the semiconductor laser 101 may be turned off during a period in which the polarization planes in the polarization rotators 102 and 105 are being rotated (i.e., the period between a time point t2-1 and a time point t2-2), so that the output from the light source device 100 can be made more vivid. However, a brighter output can be obtained by not turning off the semiconductor laser 101. The condition for turning off the semiconductor laser 101 and the off time thereof may be set in accordance with the balance between the brightness and the vividness of the output.

As mentioned above, the light source device 100 includes the semiconductor laser 101, the polarization rotators 102 and 105, the polarization splitters 103 and 106, and the fluorescent bodies 111 and 114. After controlling the polarization plane of output light from the semiconductor laser 101 by using the polarization rotators 102 and 105, the optical path of laser light is controlled by causing the laser light to travel through the polarization splitters 103 and 106, thereby controlling the timing at which the fluorescent body 111 or 114 is excited. Then, the optical path of the laser light traveling through the polarization rotators 102 and 105 and the polarization splitters 103 and 106 is controlled such that the blue light output from the semiconductor laser 101, the green light emitted from the fluorescent body 111, and the red light emitted from the fluorescent body 114 are output from the light source device 100 at different timings.

According to this configuration, the light source device 100 is constituted only of fixed components without having a mechanical component, such as a motor, or without having a large-size component, such as a wheel, and can output light beams of a plurality of colors in a time-series fashion.

The light source device 100 may be used as a light source of a projector apparatus.

In a case where blue, green, and red light beams are periodically output, if the repeating cycle thereof is sufficiently fast, the blue, green, and red light beams may mix and appear to be a single color to the human eye. Thus, the light source device 100 controls the output and the time of each of the blue, green, and red light beams so that light of any chromaticity can be output. Specifically, by fabricating an illuminating apparatus equipped with the light source device 100, a chromaticity-adjustable illuminating apparatus can be achieved. Moreover, such an illuminating apparatus is capable of outputting light of a single color, such as blue, green, or red, and is thus effective for ornamental purposes.

Although the semiconductor laser 101 according to this embodiment outputs linearly-polarized light that is perpendicular to the optical axis 120 and parallel to the plane of the drawing in FIG. 1, polarized light orthogonal thereto may alternatively be selected. In that case, for example, the arrangement of the fluorescent bodies 111 and 114, the rotational angles and the rotational timings of the polarization planes in the polarization rotators 102 and 105, and the output timing of the semiconductor laser 101 may be adjusted in view of the polarized light output from the semiconductor laser 101, the rotational control of the polarization planes in the polarization rotators 102 and 105, and the polarization splitting characteristics by the polarization splitters 103 and 106.

Furthermore, in this embodiment, the color of the laser light is blue, the optical path is controlled for causing the blue laser light to excite the green fluorescent body and the red fluorescent body, and the timing for directly outputting the laser light and the timing for outputting the green light or the red light from one of the fluorescent bodies are controlled. However, the embodiment is not necessarily limited to the configuration that obtains blue light by directly outputting laser light. For example, an ultraviolet waveband may be selected as the wavelength of the laser light, and fluorescent bodies that emit blue, green, and red light beams by being excited by ultraviolet light may be provided, so that blue, green, and red light beams can be output by being emitted from the fluorescent bodies alone. Such a configuration can similarly be achieved by modifying the configuration according to this embodiment in which the polarization rotators and the polarization splitters are disposed in the optical path.

Second Embodiment

In the first embodiment, the light source device 100 periodically outputs blue, green, and red light beams. Because blue, green, and red colors are the three primary colors for creating different colors by combining light beams, the light source device 100 can be used as a light source for displaying an image so long as it has these three colors. In addition to these three colors, for example, if a yellow or cyan color can be output, color reproducibility and the brightness of a projection image can be further enhanced. Moreover, if white light can be output, the brightness of a projection image can be further increased.

A second embodiment relates to operation for outputting yellow, cyan, and white light beams in addition to the blue, green, and red light beams by using the light source device 100 according to the first embodiment. Since the operation for outputting the blue, green, and red light beams are the same as that in the first embodiment, the description thereof will be omitted here.

Figure 6A:
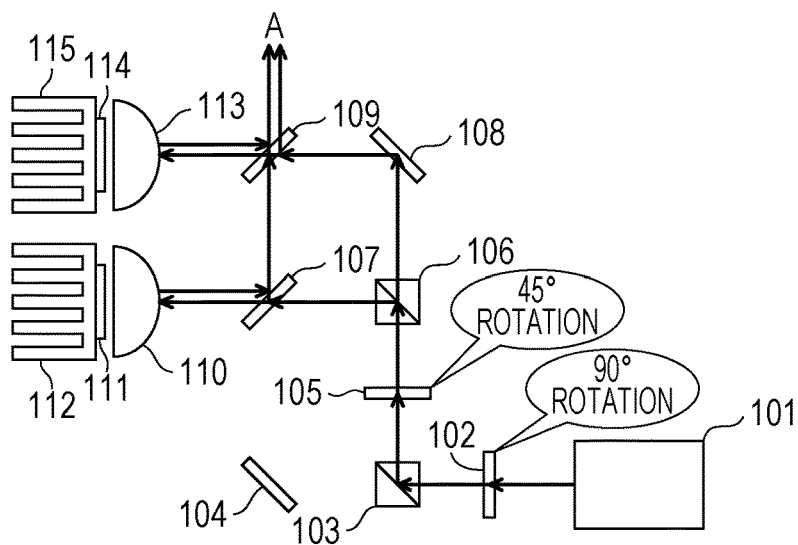
FIGS. 6A to 6C illustrate an example of the operation of a light source device according to a second embodiment, FIG. 6A illustrating the operation when the light source device outputs yellow light, FIG. 6B illustrating the operation when the light source device outputs cyan light, and FIG. 6C illustrating the operation when the light source device outputs white light.
Figure 6B:
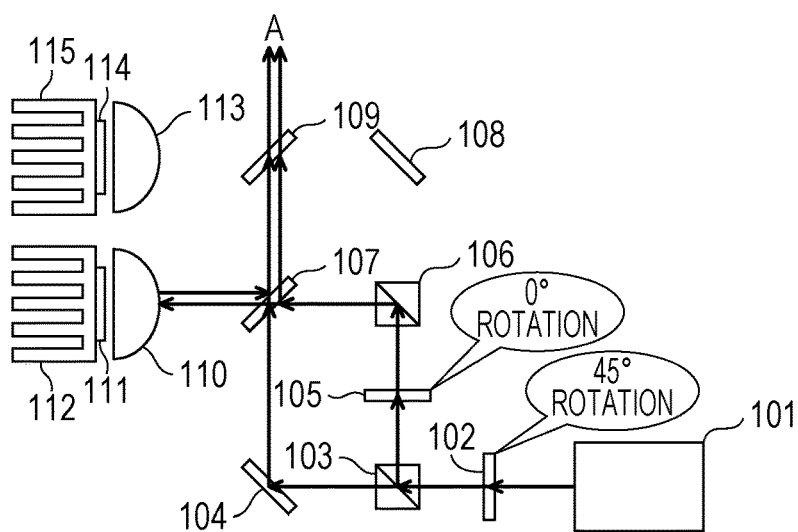
Figure 6C:
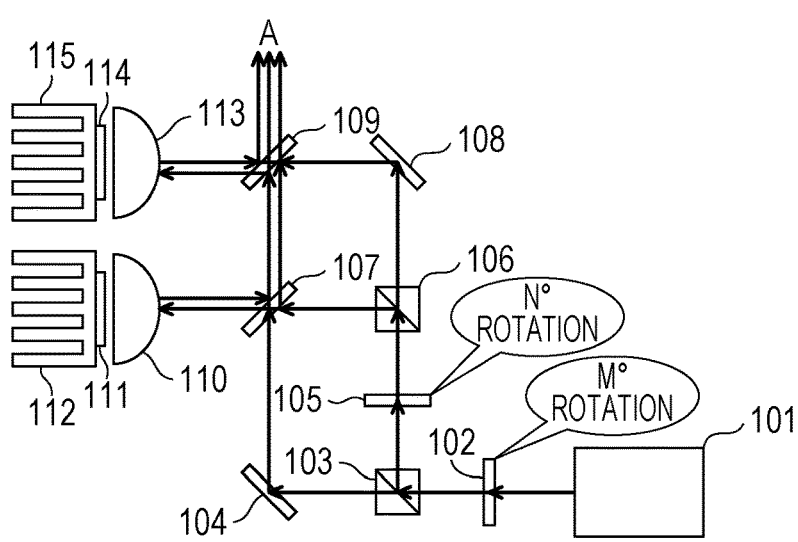

FIGS. 6A to 6C illustrate an example of the operation of the light source device 100.

FIG. 6A illustrates a state where the light source device 100 is outputting yellow light. As illustrated in FIG. 6A, when the polarization rotator 102 is controlled such that the polarization plane of laser light is rotated by 90°, blue laser light output from the semiconductor laser 101 is reflected by the polarization splitter 103 and enters the polarization rotator 105. In this case, when the polarization rotator 105 is controlled such that the polarization plane of laser light is rotated by 45°, the laser light is split by the polarization splitter 106 into light transmitted through the polarization splitter 106 and light reflected by the polarization splitter 106. The light transmitted through the polarization splitter 106 is reflected by the reflection mirror 108, is transmitted through the dichroic mirror 109, and enters the fluorescent body 114 so as to excite the fluorescent body 114. On the other hand, the light reflected by the polarization splitter 106 is transmitted through the dichroic mirror 107 and enters the fluorescent body 111 so as to excite the fluorescent body 111. Green light emitted from the fluorescent body 111 is focused by the focusing lens 110, is reflected by the dichroic mirror 107, is transmitted through the dichroic mirror 109, and is output in the A direction. Red light emitted from the fluorescent body 114 is focused by the focusing lens 113, is reflected by the dichroic mirror 109, and is output in the A direction. Consequently, yellow light having a mixture of green light and red light is output from the light source device 100.

Although the rotational angle of the polarization plane in the polarization rotator 105 is 45° in the above description, the rotational angle may be adjusted between, for example, 40° and 50°, so that the output ratio between the green light from the fluorescent body 111 and the red light from the fluorescent body 114, that is, the tone of the yellow color, can be adjusted.

FIG. 6B illustrates a state where the light source device 100 is outputting cyan light. As illustrated in FIG. 6B, when the polarization rotator 102 is controlled such that the polarization plane of laser light is rotated by 45°, blue laser light output from the semiconductor laser 101 is split by the polarization splitter 103 into light transmitted through the polarization splitter 103 and light reflected by the polarization splitter 103. The light transmitted through the polarization splitter 103 is reflected by the reflection mirror 104, is transmitted through the dichroic mirrors 107 and 109, and is output in the A direction. The light reflected by the polarization splitter 103 enters the polarization rotator 105. In this case, when the polarization rotator 105 is controlled such that the polarization plane of laser light is maintained, the laser light is reflected by the polarization splitter 106, is transmitted through the dichroic mirror 107, and enters the fluorescent body 111 so as to excite the fluorescent body 111. Green light emitted from the fluorescent body 111 is focused by the focusing lens 110, is reflected by the dichroic mirror 107, is transmitted through the dichroic mirror 109, and is output in the A direction. Consequently, cyan light having a mixture of blue light and green light is output from the light source device 100.

Although the rotational angle of the polarization plane in the polarization rotator 102 is 45° in the above description, the rotational angle may be adjusted between, for example, 40° and 50°, so that the output ratio between the blue light transmitted through the polarization splitter 103 and the green light from the fluorescent body 111, that is, the tone of the cyan color, can be adjusted.

FIG. 6C illustrates a state where the light source device 100 is outputting white light. As illustrated in FIG. 6C, when the polarization rotators 102 and 105 are controlled such that the polarization planes of laser light are rotated by M°, blue laser light output from the semiconductor laser 101 is split by the polarization splitter 103 into light transmitted through the polarization splitter 103 and light reflected by the polarization splitter 103. The light transmitted through the polarization splitter 103 is reflected by the reflection mirror 104, is transmitted through the dichroic mirrors 107 and 109, and is output in the A direction. The light reflected by the polarization splitter 103 enters the polarization rotator 105. In this case, when the polarization rotator 105 is controlled such that the polarization plane of laser light is rotated by N°, the laser light is split by the polarization splitter 106 into light transmitted through the polarization splitter 106 and light reflected by the polarization splitter 106. The light transmitted through the polarization splitter 106 is reflected by the reflection mirror 108, is transmitted through the dichroic mirror 109, and enters the fluorescent body 114 so as to excite the fluorescent body 114. On the other hand, the light reflected by the polarization splitter 106 is transmitted through the dichroic mirror 107 and enters the fluorescent body 111 so as to excite the fluorescent body 111. Green light emitted from the fluorescent body 111 is focused by the focusing lens 110, is reflected by the dichroic mirror 107, is transmitted through the dichroic mirror 109, and is output in the A direction. Red light emitted from the fluorescent body 114 is focused by the focusing lens 113, is reflected by the dichroic mirror 109, and is output in the A direction. Consequently, white light having a mixture of blue light, green light, and red light is output from the light source device 100. The values of M and N range between 20 and 70 inclusive.

Although the rotational angle of the polarization plane in the polarization rotator 102 is M° and the rotational angle of the polarization plane in the polarization rotator 105 is N° in the above description, the M and N values may be adjusted between, for example, 20° and 70°, so that the output ratio among the blue light transmitted through the polarization splitter 103, the green light from the fluorescent body 111, and the red light from the fluorescent body 114, that is, the tone of the white color, can be adjusted.

Figure 7:
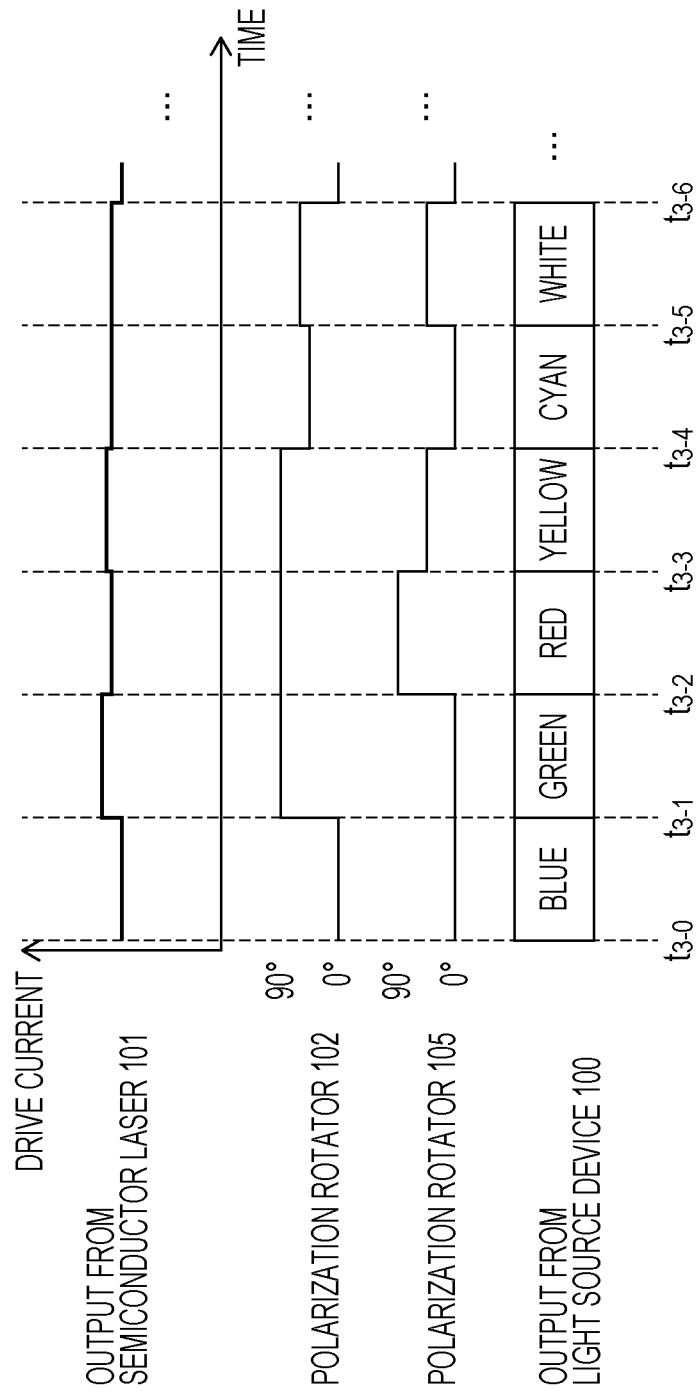
FIG. 7 is a diagram related to time-series control of a semiconductor laser and polarization rotators in accordance with the second embodiment.

FIG. 7 is a diagram related to time-series control of the semiconductor laser 101 and the polarization rotators 102 and 105 in accordance with the second embodiment.

By setting the rotational angle of the polarization plane in the polarization rotator 102 to 0° and the rotational angle of the polarization plane in the polarization rotator 105 to 0° in a period between a time point t3-0 and a time point t3-1, blue light is output from the light source device 100.

By setting the rotational angle of the polarization plane in the polarization rotator 102 to 90° and the rotational angle of the polarization plane in the polarization rotator 105 to 0° in a period between the time point t3-1 and a time point t3-2, green light is output from the light source device 100.

By setting the rotational angle of the polarization plane in the polarization rotator 102 to 90° and the rotational angle of the polarization plane in the polarization rotator 105 to 90° in a period between the time point t3-2 and a time point t3-3, red light is output from the light source device 100.

By setting the rotational angle of the polarization plane in the polarization rotator 102 to 90° and the rotational angle of the polarization plane in the polarization rotator 105 to 45° in a period between the time point t3-3 and a time point t3-4, yellow light is output from the light source device 100.

By setting the rotational angle of the polarization plane in the polarization rotator 102 to 45° and the rotational angle of the polarization plane in the polarization rotator 105 to 0° in a period between the time point t3-4 and a time point t3-5, cyan light is output from the light source device 100.

By setting the rotational angle of the polarization plane in the polarization rotator 102 to M° and the rotational angle of the polarization plane in the polarization rotator 105 to N° in a period between the time point t3-5 and a time point t3-6, red light is output from the light source device 100 (M and N being values ranging between 20 and 70 inclusive). By repeating this at a fixed cycle (e.g., 120 Hz), light beams of six colors, namely, blue, green, red, yellow, cyan, and white, are periodically output from the light source device 100. In order to balance out the blue, green, red, yellow, cyan, and white light beams, the output from the semiconductor laser 101 is adjusted in synchronization with the timing at which the rotational angles of the polarization planes in the polarization rotators 102 and 105 are changed.

As described above, the light source device 100 according to the second embodiment can output light beams of six colors, namely, blue, green, red, yellow, cyan, and white colors, in a time-series fashion.

Third Embodiment

In the first and second embodiments, two fluorescent bodies, namely, the fluorescent body 111 that emits green light and the fluorescent body 114 that emits red light, are used. A third embodiment relates to a light source device 800 in which the fluorescent body 114 according to the first and second embodiments is replaced with a semiconductor laser 802 that outputs red laser light.

Figure 8:
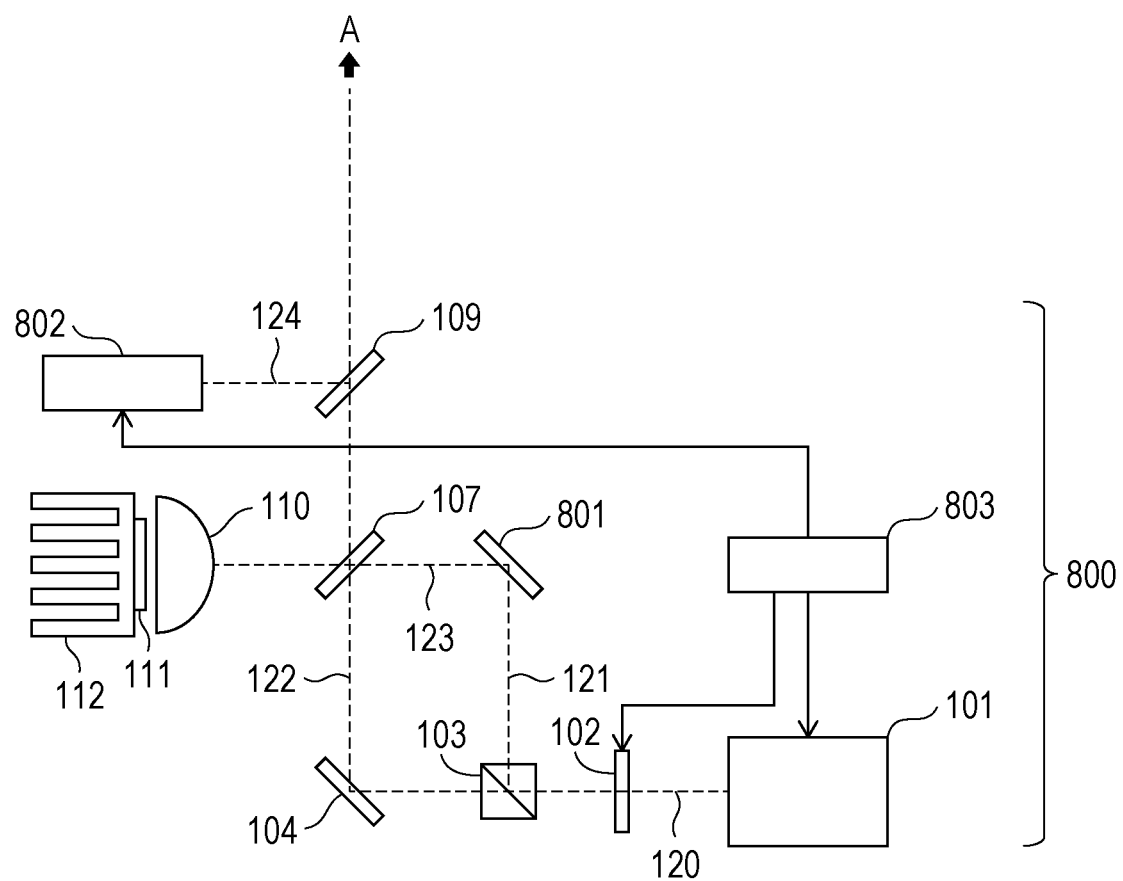
FIG. 8 illustrates the configuration of a light source device according to a third embodiment.

FIG. 8 illustrates the configuration of the light source device 800 according to the third embodiment. Components identical to those in the light source device 100 according to the first embodiment are given the same reference signs, and descriptions thereof are omitted.

The light source device 800 includes semiconductor lasers 101 and 802, a polarization rotator 102, a polarization splitter 103, reflection mirrors 104 and 801, dichroic mirrors 107 and 109, a focusing lens 110, a fluorescent body 111, a heatsink 112, and a control circuit 803.

The semiconductor laser 802 outputs red linearly-polarized laser light, which is perpendicular to the optical axis 124 and parallel to the plane of the drawing, along the optical axis 124. The semiconductor laser 802 can be configured similarly to the semiconductor laser 101 except that the emission wavelength is different therefrom. The semiconductor laser 802 does not necessarily have to have a uniform polarization direction.

The reflection mirror 801 reflects incident light. The light incident on the reflection mirror 801 after traveling along the optical axis 121 travels along the optical axis 123.

The control circuit 803 has a function for controlling the drive current to be supplied to the semiconductor lasers 101 and 802 and for outputting a control signal to be supplied to the polarization rotator 102 (e.g., for controlling an applied voltage). The drive current to be supplied to each of the semiconductor lasers 101 and 802 and the control signal to be supplied to the polarization rotator 102 are controlled while being synchronized by the control circuit 803.

Figure 9A:
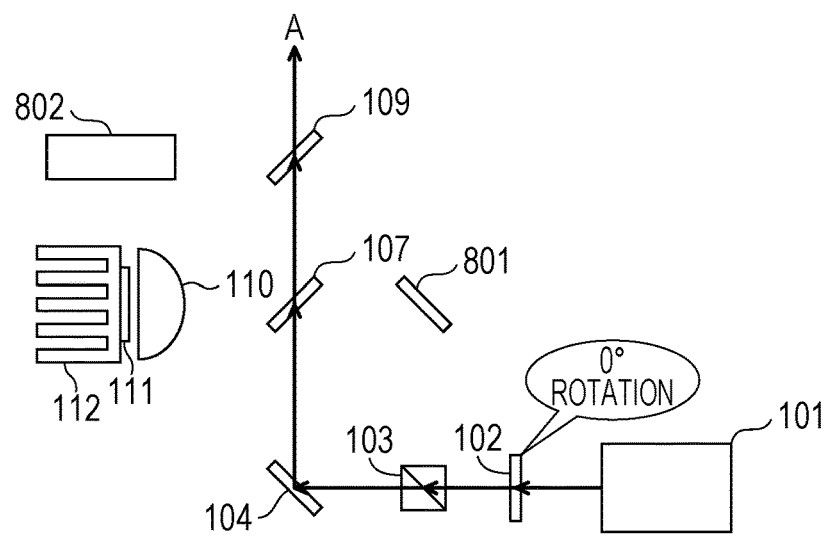
FIGS. 9A to 9C illustrate an example of the operation of the light source device according to the third embodiment, FIG. 9A illustrating the operation when the light source device outputs blue light, FIG. 9B illustrating the operation when the light source device outputs green light, and FIG. 9C illustrating the operation when the light source device outputs red light.
Figure 9B:
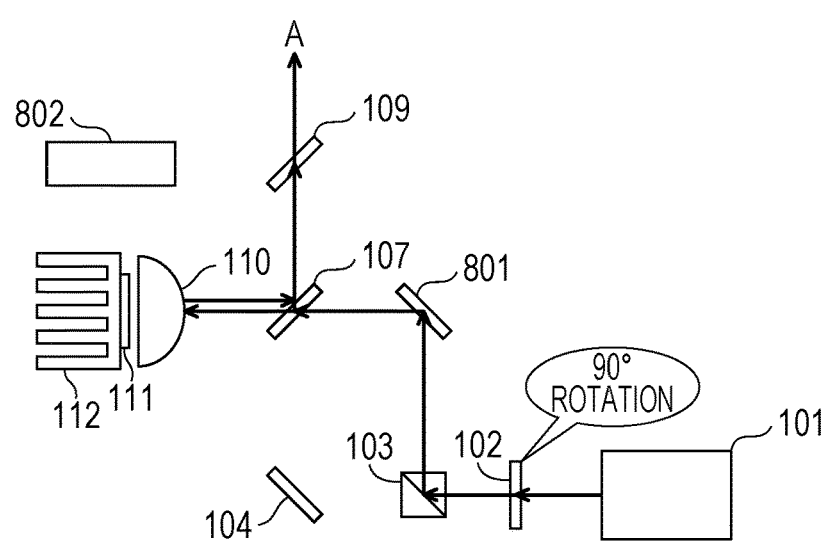
Figure 9C:
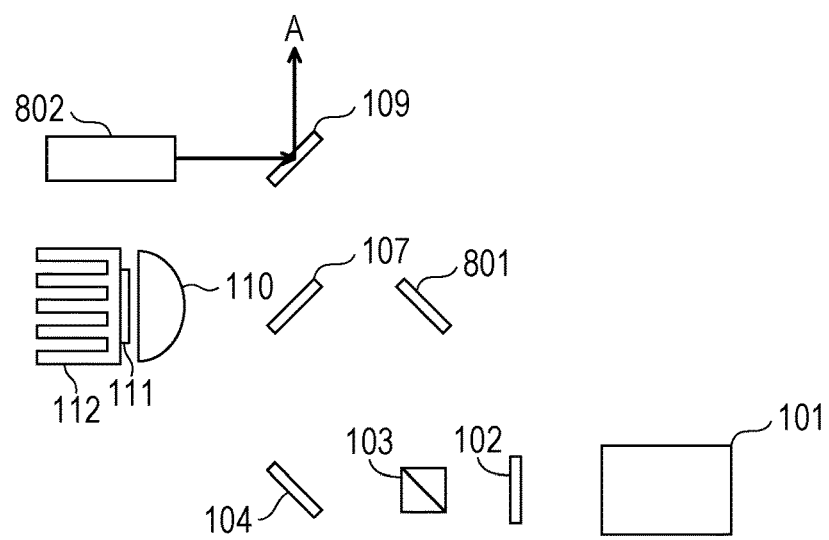

FIGS. 9A to 9C illustrate an example of the operation of the light source device 800 in FIG. 8.

FIG. 9A illustrates a state where the light source device 800 is outputting blue light. As illustrated in FIG. 9A, when the polarization rotator 102 is controlled such that the polarization plane of laser light is maintained, blue laser light output from the semiconductor laser 101 is transmitted through the polarization splitter 103, is reflected by the reflection mirror 104, is transmitted through the dichroic mirrors 107 and 109, and is output in the A direction. In this case, the semiconductor laser 802 is turned off. Consequently, the blue light is output from the light source device 800.

FIG. 9B illustrates a state where the light source device 800 is outputting green light. As illustrated in FIG. 9B, when the polarization rotator 102 is controlled such that the polarization plane of laser light is rotated by 90°, blue laser light output from the semiconductor laser 101 is reflected by the polarization splitter 103 and the reflection mirror 801, is transmitted through the dichroic mirror 107, and enters the fluorescent body 111. The fluorescent body 111 emits green light by being excited by the incident light. The green light emitted from the fluorescent body 111 is focused by the focusing lens 110, is reflected by the dichroic mirror 107, is transmitted through the dichroic mirror 109, and is output in the A direction. In this case, the semiconductor laser 802 is turned off. Consequently, the green light is output from the light source device 800.

FIG. 9C illustrates a state where the light source device 800 is outputting red light. As illustrated in FIG. 9C, red laser light output from the semiconductor laser 802 is reflected by the dichroic mirror 109 and is output in the A direction. In this case, the semiconductor laser 101 is turned off. Consequently, the red light is output from the light source device 800.

FIG. 10 is a diagram related to time-series control of the semiconductor lasers 101 and 802 and the polarization rotator 102.

By setting the rotational angle of the polarization plane in the polarization rotator 102 to 0°, turning on the semiconductor laser 101, and turning off the semiconductor laser 802 in a period between a time point t4-0 and a time point t4-1, blue light is output from the light source device 800.

By setting the rotational angle of the polarization plane in the polarization rotator 102 to 900, turning on the semiconductor laser 101, and turning off the semiconductor laser 802 in a period between the time point t4-1 and a time point t4-2, green light is output from the light source device 800.

By turning off the semiconductor laser 101 and turning on the semiconductor laser 802 in a period between the time point t4-2 and a time point t4-3, red light is output from the light source device 800.

By repeating this at a fixed cycle (e.g., 120 Hz), light beams of three colors, namely, blue, green, and red, are periodically output from the light source device 800. In order to balance out the blue, green, and red light beams, the outputs from the semiconductor lasers 101 and 802 are adjusted in synchronization with the timing at which the rotational angle of the polarization plane in the polarization rotator 102 is changed.

As compared with the light emitted from the fluorescent body, the light from the semiconductor laser has a uniform wavelength. Therefore, as compared with the light source device 100 according to the first and second embodiments, the light source device 800 according to the third embodiment can output vivid light with a sharp red tone.

Similar to the light source device 100 according to the second embodiment, the light source device 800 according to the third embodiment can obtain yellow, cyan, and white light beams by mixing light beams of a plurality of colors. Moreover, similar to the light source device 100 according to the second embodiment, the light source device 800 according to the third embodiment can output light beams of six colors, namely, blue, green, red, yellow, cyan, and white, in a time-series fashion.

As an alternative to the third embodiment in which the fluorescent body 114 that emits red light is replaced with the semiconductor laser 802 that outputs red laser light, the fluorescent body 111 that emits green light may be replaced with a semiconductor laser that outputs green laser light.

Fourth Embodiment

In the third embodiment, two different semiconductor lasers, namely, the semiconductor laser 101 that outputs blue laser light and the semiconductor laser 802 that outputs red laser light, are provided. A fourth embodiment relates to a configuration in which the two semiconductor lasers are integrated to provide a semiconductor laser 1101 that is capable of outputting both blue laser light and red laser light.

Figure 11:
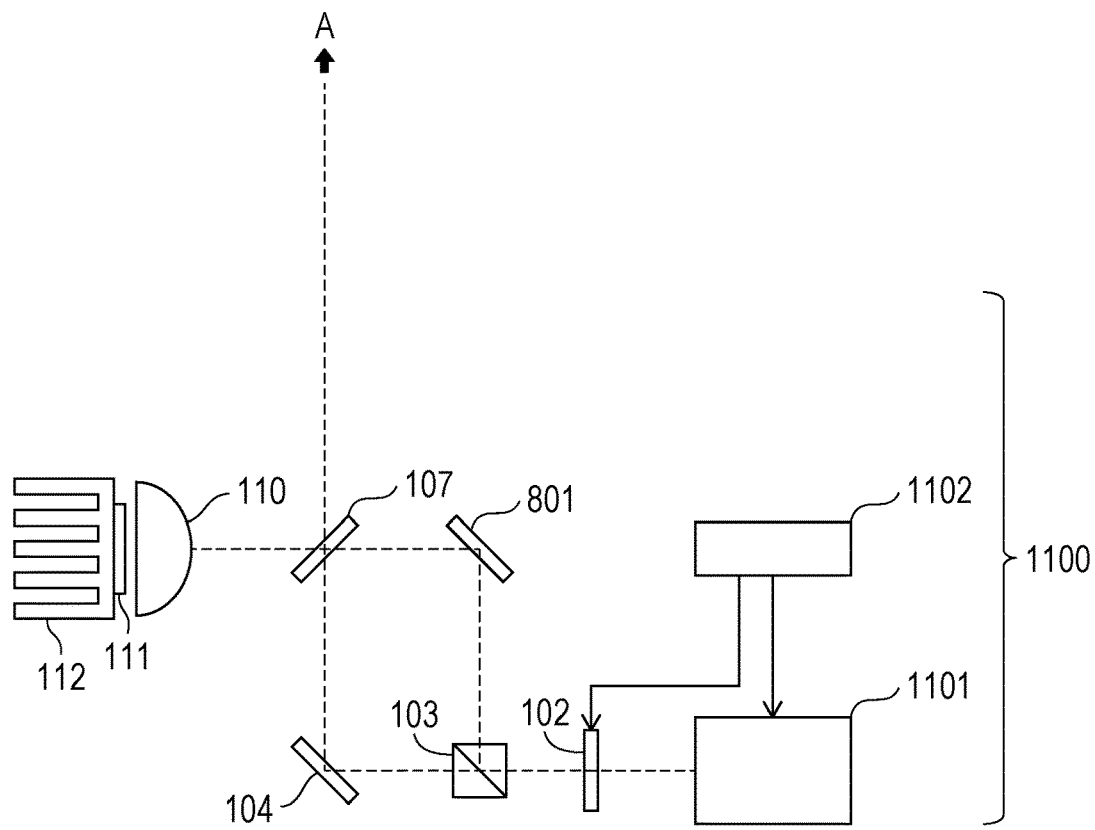
FIG. 11 illustrates the configuration of a light source device according to a fourth embodiment.

FIG. 11 illustrates the configuration of a light source device 1100 according to the fourth embodiment. Components identical to those in the light source device 100 according to the first embodiment and the light source device 800 according to the third embodiment are given the same reference signs, and descriptions thereof are omitted.

The light source device 1100 includes a semiconductor laser 1101, a polarization rotator 102, a polarization splitter 103, reflection mirrors 104 and 801, a dichroic mirror 107, a focusing lens 110, a fluorescent body 111, a heatsink 112, and a control circuit 1102.

The semiconductor laser 1101 outputs blue linearly-polarized laser light, which is perpendicular to the optical axis 124 and parallel to the plane of the drawing, along the optical axis 124. The semiconductor laser 1101 also outputs red linearly-polarized laser light, which is perpendicular to the optical axis 124 and parallel to the plane of the drawing, along the optical axis 124.

The control circuit 1102 has a function for controlling the drive current to be supplied to the semiconductor laser 1101 and for outputting a control signal to be supplied to the polarization rotator 102 (e.g., for controlling an applied voltage). The drive current to be supplied to the semiconductor laser 1101 and the control signal to be supplied to the polarization rotator 102 are controlled while being synchronized by the control circuit 1102.

The semiconductor laser 1101 includes a semiconductor laser unit 1201 having a plurality of collimator-lens-equipped semiconductor laser elements, and also includes two lenses disposed in front thereof.

Figure 12:
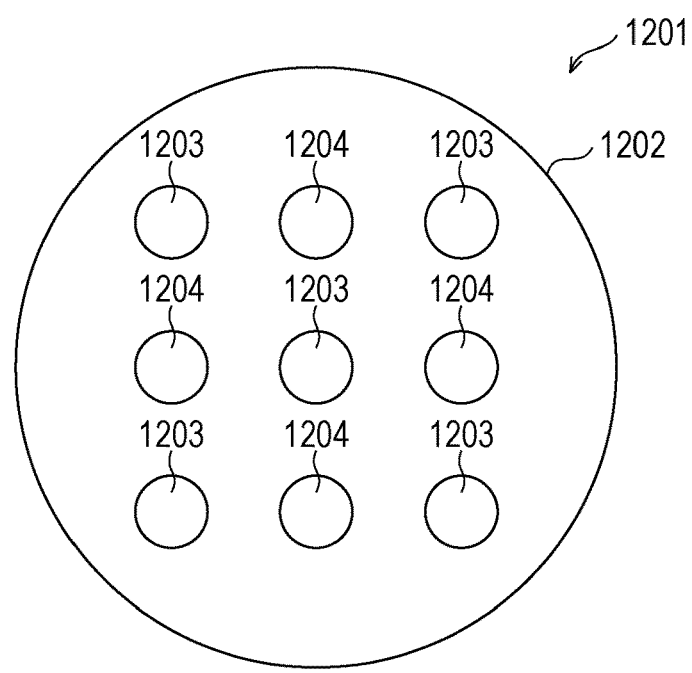
FIG. 12 is a front view of a semiconductor laser unit according to the fourth embodiment.

FIG. 12 is a front view of the semiconductor laser unit 201. As illustrated in FIG. 12, the semiconductor laser unit 1201 has a structure in which five collimator-lens-equipped semiconductor laser elements 1203 and four collimator-lens-equipped semiconductor laser elements 1204 are embedded in recesses provided in a heatsink 1202. The collimator-lens-equipped semiconductor laser elements 1203 are configured to output blue laser light with power up to a maximum of 10 W. The collimator-lens-equipped semiconductor laser elements 1204 are configured to output red laser light with power up to a maximum of 10 W. The nine collimator-lens-equipped semiconductor laser elements 1203 and 1204 individually have electrode lead wires extending from the rear surface of the heatsink 1202 so as to be connected to the control circuit 1102 in FIG. 11. By receiving the drive voltage supplied from the control circuit 1102, the collimator-lens-equipped semiconductor laser elements 1203 and 1204 can be driven individually. Thus, by being controlled by the control circuit 1102, the semiconductor laser 1101 can output blue laser light alone, red laser light alone, or a mixture of blue laser light and red laser light with any output ratio.

Figure 13A:
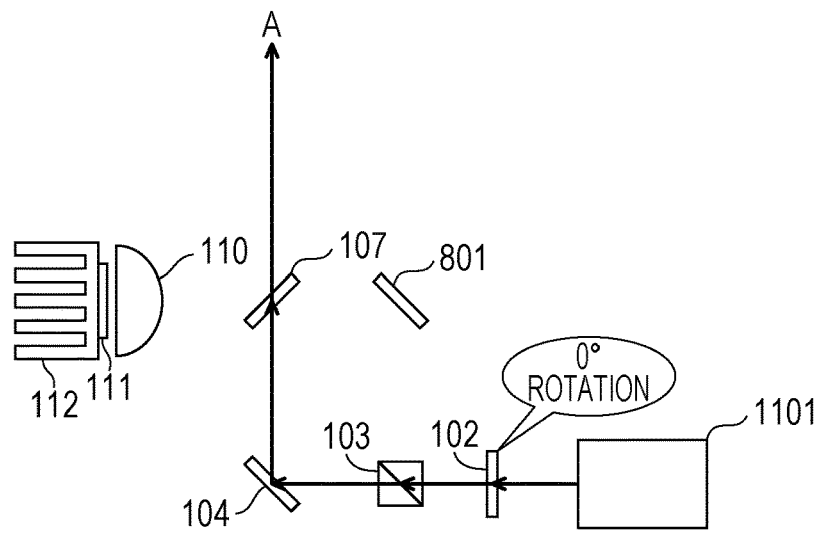
FIGS. 13A to 13C illustrate an example of the operation of the light source device according to the fourth embodiment, FIG. 13A illustrating the operation when the light source device outputs blue light, FIG. 13B illustrating the operation when the light source device outputs green light, and FIG. 13C illustrating the operation when the light source device outputs red light.
Figure 13B:
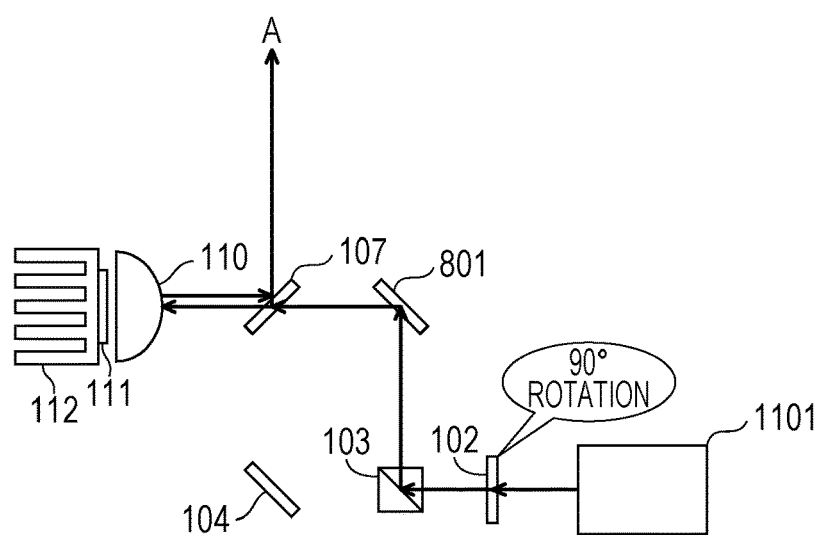
Figure 13C:
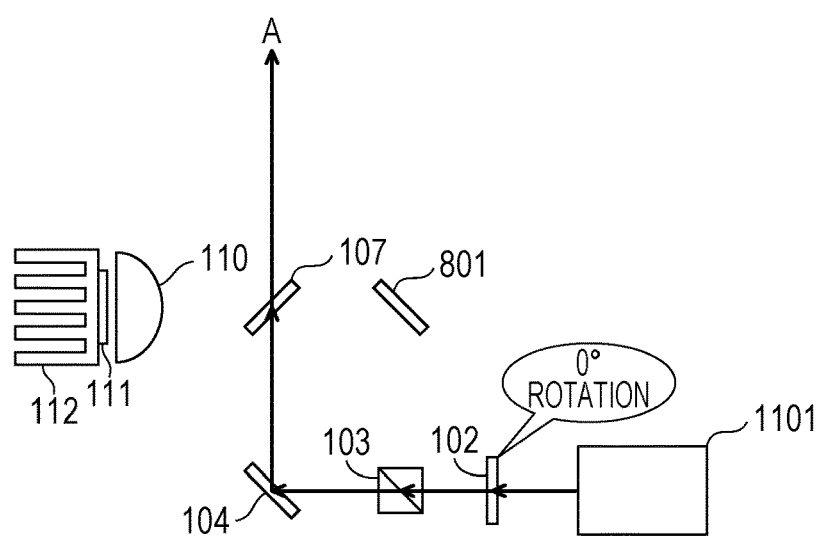

FIGS. 13A to 13C illustrate an example of the operation of the light source device 1100 in FIG. 11.

FIG. 13A illustrates a state where the light source device 1100 is outputting blue light. As illustrated in FIG. 13A, when the polarization rotator 102 is controlled such that the polarization plane of laser light is maintained, laser light output from the semiconductor laser 1101 is transmitted through the polarization splitter 103, is reflected by the reflection mirror 104, is transmitted through the dichroic mirror 107, and is output in the A direction. In this case, in the semiconductor laser 1101, the collimator-lens-equipped semiconductor laser elements 1203 that output blue laser light is turned on, and the collimator-lens-equipped semiconductor laser elements 1204 that output red laser light is turned off. Consequently, the blue light is output from the light source device 1100.

FIG. 13B illustrates a state where the light source device 1100 is outputting green light. As illustrated in FIG. 13B, when the polarization rotator 102 is controlled such that the polarization plane of laser light is rotated by 90°, laser light output from the semiconductor laser 101 is reflected by the polarization splitter 103 and the reflection mirror 801, is transmitted through the dichroic mirror 107, and enters the fluorescent body 111. The fluorescent body 111 emits green light by being excited by the incident light. The green light emitted from the fluorescent body 111 is focused by the focusing lens 110, is reflected by the dichroic mirror 107, is transmitted through the dichroic mirror 109, and is output in the A direction. In this case, in the semiconductor laser 1101, the collimator-lens-equipped semiconductor laser elements 1203 that output blue laser light is turned on, and the collimator-lens-equipped semiconductor laser elements 1204 that output red laser light is turned off. Consequently, the green light is output from the light source device 1100.

FIG. 13C illustrates a state where the light source device 1100 is outputting red light. As illustrated in FIG. 13C, when the polarization rotator 102 is controlled such that the polarization plane of laser light is maintained, laser light output from the semiconductor laser 1101 is transmitted through the polarization splitter 103, is reflected by the reflection mirror 104, is transmitted through the dichroic mirror 107, and is output in the A direction. In this case, in the semiconductor laser 1101, the collimator-lens-equipped semiconductor laser elements 1203 that output blue laser light is turned off, and the collimator-lens-equipped semiconductor laser elements 1204 that output red laser light is turned on. Consequently, the red light is output from the light source device 1100.

Figure 14:
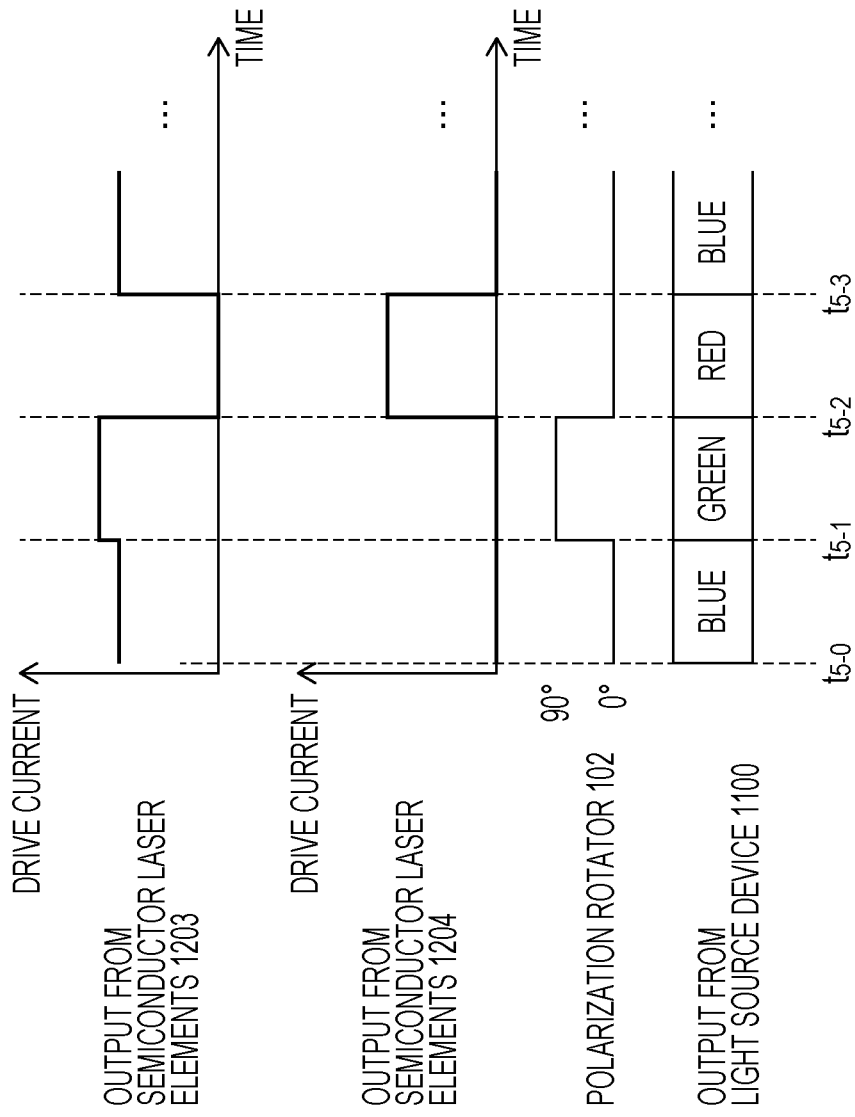
FIG. 14 is a diagram related to time-series control of semiconductor laser elements and a polarization rotator in accordance with the fourth embodiment.

FIG. 14 is a diagram related to time-series control of the semiconductor laser 1101 and the polarization rotator 102.

By setting the rotational angle of the polarization plane in the polarization rotator 102 to 0°, turning on the collimator-lens-equipped semiconductor laser elements 1203 for blue light, and turning off the collimator-lens-equipped semiconductor laser elements 1204 for red light in a period between a time point t5-0 and a time point t5-1, blue light is output from the light source device 1100.

By setting the rotational angle of the polarization plane in the polarization rotator 102 to 90°, turning on the collimator-lens-equipped semiconductor laser elements 1203 for blue light, and turning off the collimator-lens-equipped semiconductor laser elements 1204 for red light in a period between the time point t5-1 and a time point t5-2, green light is output from the light source device 1100.

By setting the rotational angle of the polarization plane in the polarization rotator 102 to 0°, turning off the collimator-lens-equipped semiconductor laser elements 1203 for blue light, and turning on the collimator-lens-equipped semiconductor laser elements 1204 for red light in a period between the time point t5-2 and a time point t5-3, red light is output from the light source device 1100.

By repeating this at a fixed cycle (e.g., 120 Hz), light beams of three colors, namely, blue, green, and red, are periodically output from the light source device 1100. In order to balance out the blue, green, and red light beams, the outputs from the collimator-lens-equipped semiconductor laser elements 1203 and 1204 are adjusted in synchronization with the timing at which the rotational angle of the polarization plane in the polarization rotator 102 is changed.

The light source device 1100 according to the fourth embodiment is configured to output blue laser light and red laser light from the same semiconductor laser 1101. With this configuration, the same optical path of the laser light can be used when blue laser light is to be output from the light source device 1100 and when red laser light is to be output therefrom, thereby reducing the number of optical components. Moreover, the same heat dissipation system for laser light can be used between blue and red colors, thereby reducing the number of components in the entire light source device.

The light source device according to each of the above embodiments can be used as a light source in a projector apparatus or an illuminating apparatus.

The present disclosure contains subject matter related to that disclosed in Japanese Priority Patent Application JP 2018-059789 filed in the Japan Patent Office on Mar. 27, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A light source device comprising:
a semiconductor laser that outputs laser light;
a polarization rotator that rotates a polarization plane of the light output from the semiconductor laser in accordance with a control signal;
a polarization splitter that transmits and reflects the light passing through the polarization rotator in accordance with the polarization plane; and
a fluorescent body that emits light by being excited by the light traveling via the polarization splitter,
wherein an amount of the light that excites the fluorescent body is controlled by controlling a rotational angle of the polarization plane in the polarization rotator in a time-series fashion.
2. The light source device according to claim 1,
wherein an optical path of the light traveling via the polarization splitter is controlled such that the light emitted from the fluorescent body and the light output from the semiconductor laser are output from the light source device at different timings.
3. The light source device according to claim 1,
wherein the fluorescent body includes a first fluorescent body and a second fluorescent body that have different principal emission wavelengths, and
wherein an optical path of the light traveling via the polarization splitter is controlled such that the first fluorescent body and the second fluorescent body are excited at different timings.

4. The light source device according to claim 1, wherein the polarization rotator is controlled repeatedly in accordance with a specific time-series pattern.

5. The light source device according to claim 1, wherein control of the polarization rotator and output control of the semiconductor laser are performed in synchronization with each other.

6. The light source device according to claim 1, wherein the laser light output from the semiconductor laser is blue laser light.

7. The light source device according to claim 1, wherein the light emitted from the fluorescent body has a green color.

8. The light source device according to claim 1, wherein the light emitted from the fluorescent body has a red color.

9. The light source device according to claim 1, wherein the fluorescent body is fixed.

10. The light source device according to claim 6, further comprising:
a semiconductor laser that outputs red laser light,
wherein the semiconductor laser that outputs the red laser light and the semiconductor laser that outputs the blue laser light are driven at different timings.

11. The light source device according to claim 1, wherein the semiconductor laser has a semiconductor laser element that outputs blue laser light and a semiconductor laser element that outputs red laser light, and
wherein the semiconductor laser element that outputs the red laser light and the semiconductor laser element that outputs the blue laser light are driven at different timings.

12. A projector apparatus comprising:
the light source device according to claim 1.

13. An illuminating apparatus comprising:
the light source device according to claim 1.

* * * * *